United States Patent [19]
Busch et al.

[11] Patent Number: 5,047,184
[45] Date of Patent: Sep. 10, 1991

[54] PROCESS AND VACUUM MOLD FOR THE MANUFACTURE OF A TEXTILE COVERED CUSHION

[75] Inventors: Ralf Busch, Ketsch; Volker Onnenberg, Drabenderhoehe, both of Fed. Rep. of Germany

[73] Assignee: Bayer Aktiengesellschaft, Bayerwerk, Fed. Rep. of Germany

[21] Appl. No.: 210,696

[22] Filed: Jun. 23, 1988

[30] Foreign Application Priority Data

Jul. 7, 1987 [DE] Fed. Rep. of Germany ....... 3722321

[51] Int. Cl.$^5$ ............................................. B29C 67/22
[52] U.S. Cl. .................................. 264/46.6; 264/46.8; 264/511
[58] Field of Search ..................... 264/511, 46.6, 46.8; 425/112, 125, 388

[56] References Cited

U.S. PATENT DOCUMENTS

| | | | |
|---|---|---|---|
| 3,337,664 | 8/1967 | Lyon | 264/553 |
| 3,943,215 | 3/1976 | Grüne et al. | 264/46.6 |
| 4,087,224 | 5/1978 | Moser | 425/388 |
| 4,501,541 | 2/1985 | Bethell et al. | 264/46.6 |
| 4,761,257 | 8/1988 | Bunn | 264/46.8 |

FOREIGN PATENT DOCUMENTS

| | | | |
|---|---|---|---|
| 2746686 | 4/1979 | Fed. Rep. of Germany | 264/511 |
| 56-157312 | 12/1981 | Japan | 264/511 |

Primary Examiner—Robert A. Dawson
Assistant Examiner—Allan R. Kuhns
Attorney, Agent, or Firm—Joseph C. Gil

[57] ABSTRACT

A vacuum mold and process for manufacturing a textile-covered cushion. The process broadly comprises back foaming, wherein (i) the cover is placed on the edge of a vacuum molding part at least partly containing a mold cavity and is stretched before a vacuum is applied to the mold cavity, (ii) the cover is sucked into position, (iii) a foamable reaction mixture is then applied to the back of the cover and (iv) when the reaction mixture has set to form the foam core, the cushion is removed from the mold, the improvement wherein prior to the application of the vacuum to the mold cavity, the cover is brought into contact with at least one moveable section of the wall of the mold cavity as it is positioned over the mold cavity, the cover is fixed to this section and the section together with the cover fixed thereto is then moved into the molding position.

6 Claims, 2 Drawing Sheets

PROCESS AND VACUUM MOLD FOR THE MANUFACTURE OF A TEXTILE COVERED CUSHION

BACKGROUND OF THE INVENTION

The present invention relates to a process and to a vacuum mold for the manufacture of a textile covered cushion, in particular a seat cushion for use inside a motor vehicle, by back foaming, in which the cover is placed on the edge of a vacuum mold and is stretched before a vacuum is applied to the cavity. The cover is sucked into position and a foamable reaction mixture is then applied to the back of the cover. After the reaction mixture has set to form the foam core the cushion is removed from the mold.

When a cover is positioned and fixed on the edge around the mold cavity by means of a stretching frame (U.S. Pat. No. 3,943,215), the cover frequently sags into the mold cavity. This may cause creases. If the cover is patterned on the visible side or if it is composed of various patterned or unpatterned sections of different colors joined together, inaccurate positioning of the cover inside the cavity may lead to irreparable damage so that the part has to be scrapped. Such an obvious fault would clearly be unacceptable to the customer.

The problem arises of providing a process and a vacuum mold by which the formation of creases in the manufacture of such a cushion can be avoided. Covers composed of patterned or unpatterned sections or different colors can be accurately and reproducibly positioned.

DESCRIPTION OF THE INVENTION

Figure 1:
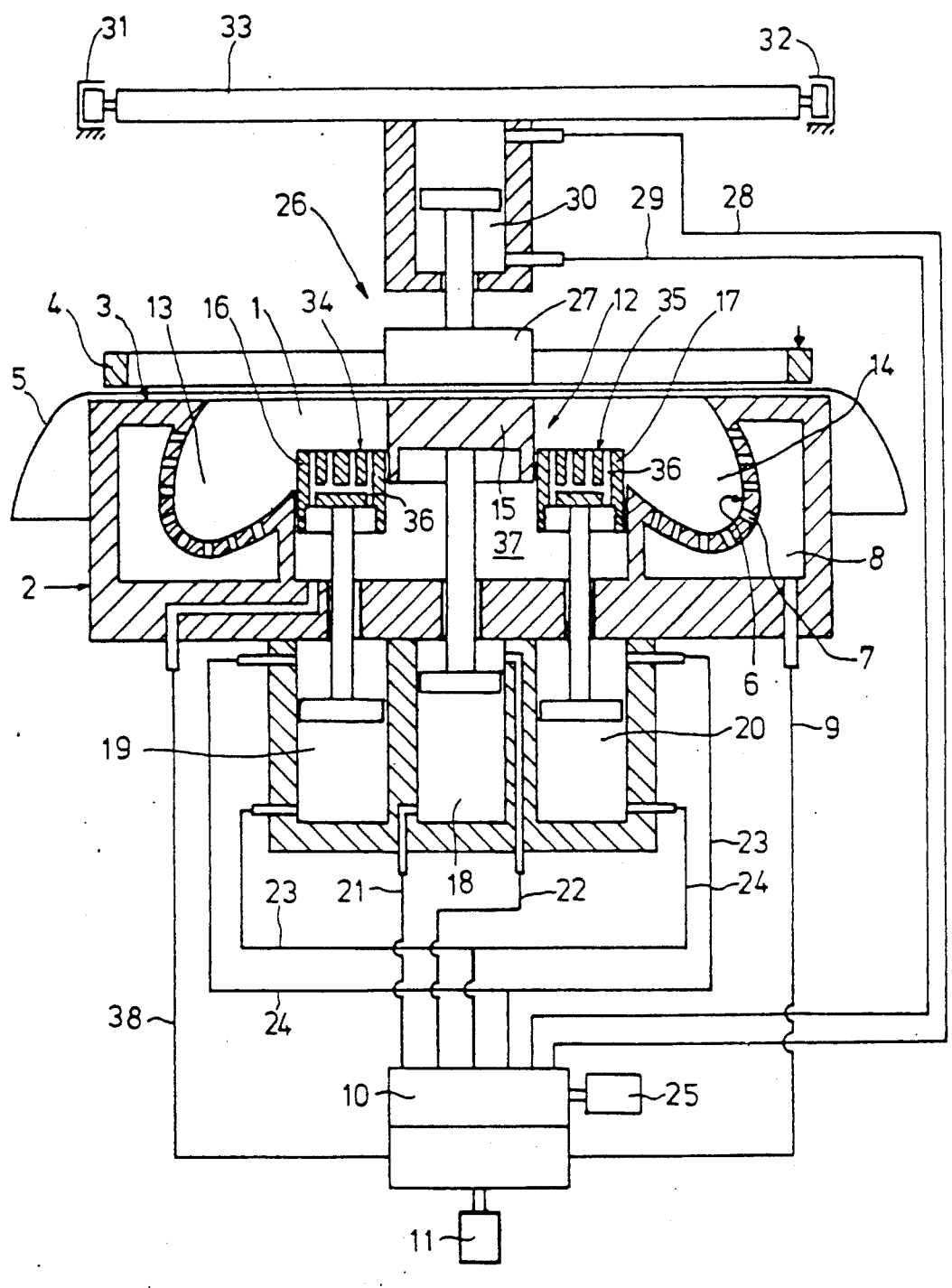
FIG. 1 shows the vacuum molding part with the cover in position before it is drawn into the mold cavity.

To solve the above problem, when the cover is positioned over the mold cavity and before a vacuum is applied to the cavity, the cover is brought into contact with at least one moveable section of the wall of the cavity and is fixed to this part. The section together with the cover fixed thereto is moved into the position for molding. It is at this point that a vacuum is applied to the mold cavity.

Since the cover does not hang into the cavity, it can be exactly positioned on the raised part of the wall of the mold cavity and will not be pulled out of shape after it has been fixed. In a mold for the manufacture of seat cushions for motor vehicles, for example, the wall of the cavity corresponding to the seating surface may be constructed as a moveable section because its boundaries generally coincide with the boundary lines of the patterned and unpatterned or differently colored sections of the cover. The seams between the sections then serve as markings and it is easy to feel by hand whether the seams coincide with the lateral edges of the moveable section of the wall. Where there is no such correspondence in size between the moveable section and an exposed section of the cushion, it is advisable to provide markings on the back surface of the cover, for example in the form of an imprint which can be scanned optically or in the form of eyelets or pieces of piping, preferably at the corners of the cover. Such eyelets or piping serve as gripping and positioning aids and are particularly advantageous when the section of cover is to be gripped and placed into position automatically. Within the general idea of the present invention it would, of course, also be possible to fix a part of the mold cavity and make the remainder of the vacuum mold moveable.

According to a first embodiment of the new process, the cover is fixed to the moveable section by means of a vacuum. According to a second embodiment, the cover is fixed by means of an upper ram.

The application of a vacuum would appear to be the more suitable solution since a vacuum connection must in any case be provided and the expenditure in apparatus is therefore less. In addition, the operators can then see the cover more clearly because it is not obscured by an upper ram.

A combination of the two variations, could, of course be employed. This could be advantageous for covers which are made of a highly air permeable material. The upper ram, of course, must be withdrawn before the foamable reaction mixture is introduced.

Preferably, at least one other moveable section of the wall of the cavity is placed in a given position which is at a lower level then the first section. When the first section has moved a certain distance the cover is also fixed to the second section which is then also moved into the molding position. This means that if a cavity has a very complicated shape, the cover can be held in a fixed position over a very large area while it is drawn into the cavity. This facilitates the application of the cover to the remaining areas of the wall of the cavity. More than two moveable sections could, of course, be provided and particular parts could be moved simultaneously. Clearly the process can be readily adapted to the geometry of the particular mold cavity.

According to another particular embodiment, the speed of movement of at least one of the sections is controlled.

It is thereby possible to adjust the sliding movement of the cover as it follows the moving section so that the cover is able to place itself at every point against the wall of the mold cavity. It may in some cases be advisable (depending on the stiffness of the material of the cover), first to determine experimentally the optimum speed of movement and the optimum change in the speed of movement.

The movement of at least one of the sections may be briefly interrupted if necessary. This may be particularly useful if one or other of the sections of the mold cavity are still moving into position while a vacuum is applied to the remainder of the cavity. In that case the cover can be encouraged to make contact with certain areas of the mold cavity rather than with others, with overstretching of the cover avoided.

Another embodiment of the process lies in somewhat loosening the attachment to the moveable section from time to time, in much the same way as the stretching frame is loosened, so that the cover can slide over the part or can stretch.

The new vacuum mold for the manufacture of a cushion with textile cover, in particular a car seat cushion, by back foaming is based on a vacuum mold member at least partly containing the mold cavity, which cavity conforms to the contour of the finished cushion and has a perforated wall and is designed to be connected to a source of vacuum. A stretching frame is associated with the edge surrounding the mold cavity.

The key to the present invention is that a section of the wall of the mold cavity consists of at least one part which is displaceable in relation to the surface of the vacuum mold and is associated with a fixing device. The function has already been described in connection with the process. It goes without saying that the movement of the section is preferably provided by a hydraulic drive as this would be the most suitable arrangement. Mechanical, pneumatic or even electromagnetic drive means could, of course, be provided.

According to one embodiment, the fixing device consists of a perforation of the moveable section with a connection to a source of vacuum. According to another embodiment, the fixing device consists of an upper ram which can move with the moveable section.

The "upper ram" embodiment is generally less suitable because the operators then have difficulty in observing the cover being drawn into the mold. It is, however, particularly suitable if the upper ram is designed that it can remove the cover from a stack, carry it over the mold cavity and position it both on the edge and on the moveable part.

It is particularly advantageous to provide a program control apparatus for controlling the process of movement and fixing. The program control apparatus is an optimum aid by which the optimum movement of the cover into the mold cavity can be rendered reproducible.

An exemplary embodiment of the new vacuum mold is represented as purely schematic sectional views in the drawings and described below.

Figure 2:
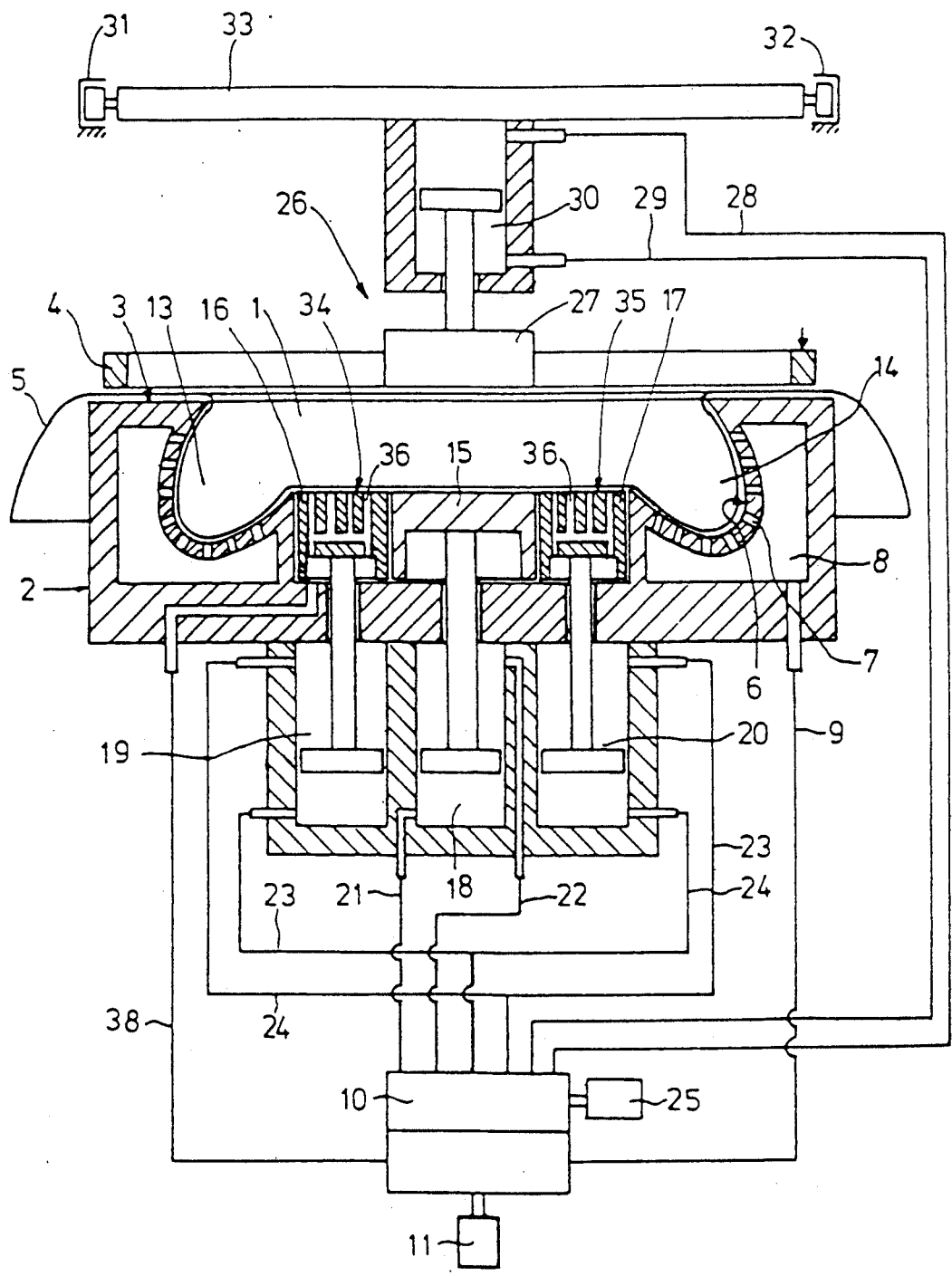
FIG. 2 shows the vacuum molding part with the cover drawn into the mold cavity.

In FIGS. 1 and 2, the vacuum mold comprises a vacuum molding part 2 containing the mold cavity 1 and a cover (not shown). A stretching frame 4 is associated with the edge 3 surrounding the mold cavity 1. This frame presses a cover 5 which is placed over the edge 3 of the mold cavity 1 against the edge 3 with a slight force so that the cover 5 can slide over the edge but with its movement braked. The mold cavity wall 6, which includes the bottom of the mold cavity 1, has perforations 7 in the form of channels which connect the mold cavity 1 to a suction chamber 8 arranged behind the wall 6. This suction chamber 8 is connected to a program control apparatus 10 and a source of vacuum 11 by a suction pipe 9. The mold cavity 1 is designed for the manufacture of a car seat cushion and can therefore be sub-divided into a central seating section 12 and two side sections 13, 14. The section of the wall 6 designed for the central seating section 12 is composed of three moveable sections 15, 16, 17 of which the sections 16 and 17 are arranged on either side of the section 15 and are also parallel in their function. All three sections 15, 16, 17 are equipped with hydraulic drives 18, 19, 20, the drives 19 and 20 operating in parallel. The hydraulic drive 18 is connected to pipes 21, 22 and the hydraulic drives 19 and 20 are connected by branching ducts 23, 24 to a program control apparatus 10 (indicated schematically) which contains inter alia control valves (not shown) and is connected to a hydraulic pump 25. Associated with the moveable section 15 is a fixing device 26 comprising a so-called upper ram which also has a hydraulic drive 30 which is connected to the program control apparatus 10 by pipes 28, 29. This fixing device 26 is attached to a support 33 displaceable in rails 31, 32. Each of the fixing devices 34, 35 of the sections 16, 17 consists of perforations 36 in the form of channels which connect the mold cavity 1 to the chamber 37 situated behind the parts 15, 16, 17. This chamber 37 is connected to the program control apparatus 10 by a suction pipe 38.

The mode of operation of this vacuum mold and the stages of production of a car seat cushion in this mold are described below.

This support 33 has been moved out of the region of the mold cavity 1, the stretching frame 4 is raised and the moveable sections 15, 16, 17 are in the position shown in FIG. 1. A cover 5 is placed over the edge 3 and the section 15 and is exactly positioned and stretched by means of the stretching frame 4. The cover 5 is also fixed to the section 15 by the upper ram 27. The moveable section 15 is then lowered together with the upper ram 27. When the section 15 has reached the level of the sections 16 and 17, their pneumatic fixing devices 34, 35 are brought into operation so that suction is applied to the cover and the cover is fixed in position. The sections 16 and 17 now move simultaneously with the sections 15 into their molding position. At the same time that all three sections 15, 16, 17 are moving downwards, a vacuum is also applied to the remaining parts of the mold cavity 1. When the sections 15, 16, 17 reach their end position shown in FIG. 2, the cover 5 is in full contact with the wall 6. The upper ram 27 is then raised, the fixing device 26 is moved out of the mold cavity 1 by means of the support 33, a reaction mixture for producing a flexible polyurethane foam is applied in a given quantity to the back of the cover 5, and the mold cavity 1 is closed by a lid. When the reaction mixture has set to form a flexible foam core, the cushion is removed from the mold and the next manufacturing cycle can begin.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the manufacture of a cushion provided with a textile cover by back foaming, wherein (i) the cover is placed on the edge of a vacuum molding part at least partly containing a mold cavity and is stretched before a vacuum is applied to the mold cavity, (ii) the cover is sucked into position, (iii) a foamable reaction mixture is then applied to the back of the cover and (iv) when the reaction mixture has set to form the foam core, the cushion is removed from the mold, the improvement wherein prior to the application of the vacuum to the mold cavity, the cover is brought into contact with at least one moveable section of the wall of the mold cavity as it is positioned over the mold cavity, the cover is fixed to this section and the section together with the cover fixed thereto is then moved into the molding position.

2. The process of claim 1, wherein fixing of the cover to the moveable section is brought about by means of a vacuum.

3. The process of claim 1, wherein fixing of the cover to the moveable section is carried out by means of an upper ram which is displaceable therewith.

4. The process of claim 1, wherein at least one other moveable section of the wall of the mold cavity is placed in a pre-determined position but at a lower level than the first section and when the first section has moved through a certain distance the cover is fixed to the second section and in that this second section is then also moved into the molding position.

5. The process of claim 4, wherein the speed of movement of at least one of said moveable sections is controlled.

6. The process of claim 1, wherein the movement of at least one of said moveable sections is briefly interrupted.

* * * * *